US008817711B2

(12) United States Patent
Baker

(10) Patent No.: US 8,817,711 B2
(45) Date of Patent: Aug. 26, 2014

(54) METHOD AND SYSTEM FOR CONCURRENTLY LOCATING SYSTEMATIC BITS AND PARITY BITS IN PHYSICAL CHANNEL MEMORY TO INCREASE HARQ PROCESSING SPEED IN 3GPP CPC SYSTEM

(75) Inventor: Simon Baker, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 1003 days.

(21) Appl. No.: 12/768,486

(22) Filed: Apr. 27, 2010

(65) Prior Publication Data

US 2011/0149883 A1 Jun. 23, 2011

Related U.S. Application Data

(60) Provisional application No. 61/288,235, filed on Dec. 18, 2009.

(51) Int. Cl.
*H04J 1/16* (2006.01)

(52) U.S. Cl.
USPC .......................................... 370/329; 370/338

(58) Field of Classification Search
USPC .................................................. 370/329, 338
See application file for complete search history.

(56) References Cited

U.S. PATENT DOCUMENTS

| 2005/0201283 A1* | 9/2005 | Yoon et al. ..................... 370/232 |
| 2007/0189248 A1* | 8/2007 | Chang et al. .................. 370/338 |
| 2009/0028129 A1* | 1/2009 | Pi et al. ......................... 370/351 |
| 2009/0207781 A1* | 8/2009 | Sidi et al. ....................... 370/328 |
| 2009/0296643 A1* | 12/2009 | Cave et al. .................... 370/329 |

* cited by examiner

*Primary Examiner* — Mark Rinehart
*Assistant Examiner* — Matthew Hopkins
(74) *Attorney, Agent, or Firm* — Sterne, Kessler, Goldstein & Fox P.L.L.C.

(57) ABSTRACT

A UE receives a HS-PDSCH transmission from a base station and concurrently performs rate matching on systematic bits and parity bits (parity 1 bits, parity 2 bits) of the received HS-PDSCH transmission. The systematic bits and parity bits are buffered in a CPC circular buffer to support HARQ processing in a HS-SCCH-less operation of the base station. Memory locations are computed for the systematic bits and the parity bits according to corresponding transmission parameters such as, for example, redundancy version, number of systematic bits and/or number of physical channels. The systematic bits and the parity bits are stored in the corresponding computed memory locations of the CPC circular buffer. At least a portion of the stored systematic bits and parity bits are concurrently generated based on corresponding transmission parameters from the CPC circular buffer per request to support concurrent rate matching on systematic bits and parity bits.

20 Claims, 6 Drawing Sheets

METHOD AND SYSTEM FOR CONCURRENTLY LOCATING SYSTEMATIC BITS AND PARITY BITS IN PHYSICAL CHANNEL MEMORY TO INCREASE HARQ PROCESSING SPEED IN 3GPP CPC SYSTEM

CROSS-REFERENCE TO RELATED APPLICATIONS/INCORPORATION BY REFERENCE

This patent application makes reference to, claims priority to and claims the benefit from U.S. Provisional Application Ser. No. 61/288,235 filed on Dec. 18, 2009.

The above stated application is hereby incorporated herein by reference in its entirety.

FIELD OF THE INVENTION

Certain embodiments of the invention relate to signal processing for communication systems. More specifically, certain embodiments of the invention relate to a method and system for concurrently locating systematic bits and parity bits in physical channel memory to increase HARQ processing speed in 3GPP CPC system.

BACKGROUND OF THE INVENTION

Wideband Code Division Multiple Access (WCDMA) mobile wireless systems have enjoyed widespread uptake of high-quality circuit-switched applications like voice and video telephony. However, they have yet to deliver to the vision of a truly ubiquitous mobile data primarily due to the absence of an efficient high-speed-packet-switched data transmission platform. Data services like mobile Internet access require asymmetric packet switched networks to best utilize the available spectrum in a multiuser environment.

High-speed downlink packet access (HSDPA) is a packet-based data service in W-CDMA downlink with theoretical peak data rates of up to 14.4 Mbps or higher by utilizing adaptive modulation and coding (AMC), hybrid ARQ (HARQ), and fast MAC scheduling. HSDPA offers high-speed downlink shared channel (HS-DSCH) that carries control information of the associated HSDPA data channel. The HS-DSCH is a mechanism to enable sharing of the HSDPA channel among multiple users. Using these channels, HSDPA systems may provide excellent packet-switched data services to several users simultaneously and efficiently.

To implement the HSDPA feature, three new physical channels, High Speed physical Downlink-Shared Channel (HS-PDSCH), High-speed Shared Control Channel (HS-SCCH), and Uplink High-Speed Dedicated Physical Control Channel (HS-DPCCH), are introduced in the physical layer specifications to enable HS-DSCH transmission. The HS-SCCH is a downlink control channel that is utilized to inform mobile devices, also called user equipment, when HSDPA data carried over the HS-PDSCH is scheduled for them, and how they may receive and decode the HSDPA data. Up to four HS-SCCH may be observed for each mobile device. The mobile devices needs to decode the HS-SCCH that carries control information such as modulation scheme, number of physical channels, transport block format, and HARQ information, for HS-PDSCH before it gets decoded on the HS-PDSCH. The HS-DPCCH is an uplink control channel used by the mobile devices to report the downlink channel quality and/or request packet retransmissions to the network.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or system for concurrently locating systematic bits and parity bits in physical channel memory to increase HARQ processing speed in 3GPP CPC system, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for concurrently locating systematic bits and parity bits in physical channel memory to increase HARQ processing speed in 3GPP CPC system. In various embodiments of the invention, a communication device such as user equipment (UE) may be operable to receive a HS-PDSCH transmission from a base station. The UE may be operable to concurrently perform rate matching on systematic bits and parity bits of the received HS-PDSCH transmission. The systematic bits and parity bits (parity 1 bits and parity 2 bits) of the received HS-PDSCH transmission may be buffered in a physical channel memory such as a CPC circular buffer to support HARQ processing in a HS-SCCH-less operation 130 of the base station. The UE may be operable to compute memory locations for the systematic bits and the parity bits in the CPC circular buffer according to corresponding transmission parameters comprising, for example, redundancy version, number of systematic bits and/or number of physical channels that are used in the received HS-PDSCH transmission. The systematic bits and the parity bits of the received HS-PDSCH transmission may be stored in the CPC circular buffer according to the corresponding computed memory locations. The UE may be operable to compute, in instances when it may be required, memory locations for systematic bits and parity bits of interest, which comprise at least a portion of the stored systematic bits and a portion of the stored parity bits in the CPC circular buffer, according to corresponding transmission parameters. The UE may be operable to request the portion of the stored systematic bits and the portion of the stored parity bits from the CPC circular buffer according to their corresponding computed memory locations. The CPC circular buffer may be operable to concurrently generate the portion of the stored systematic bits and the portion of the stored parity bits according to the request. The UE may be operable to concurrently perform rate matching on the generated portion of the stored systematic bits and the generated portion of the stored parity bits.

Figure 1:
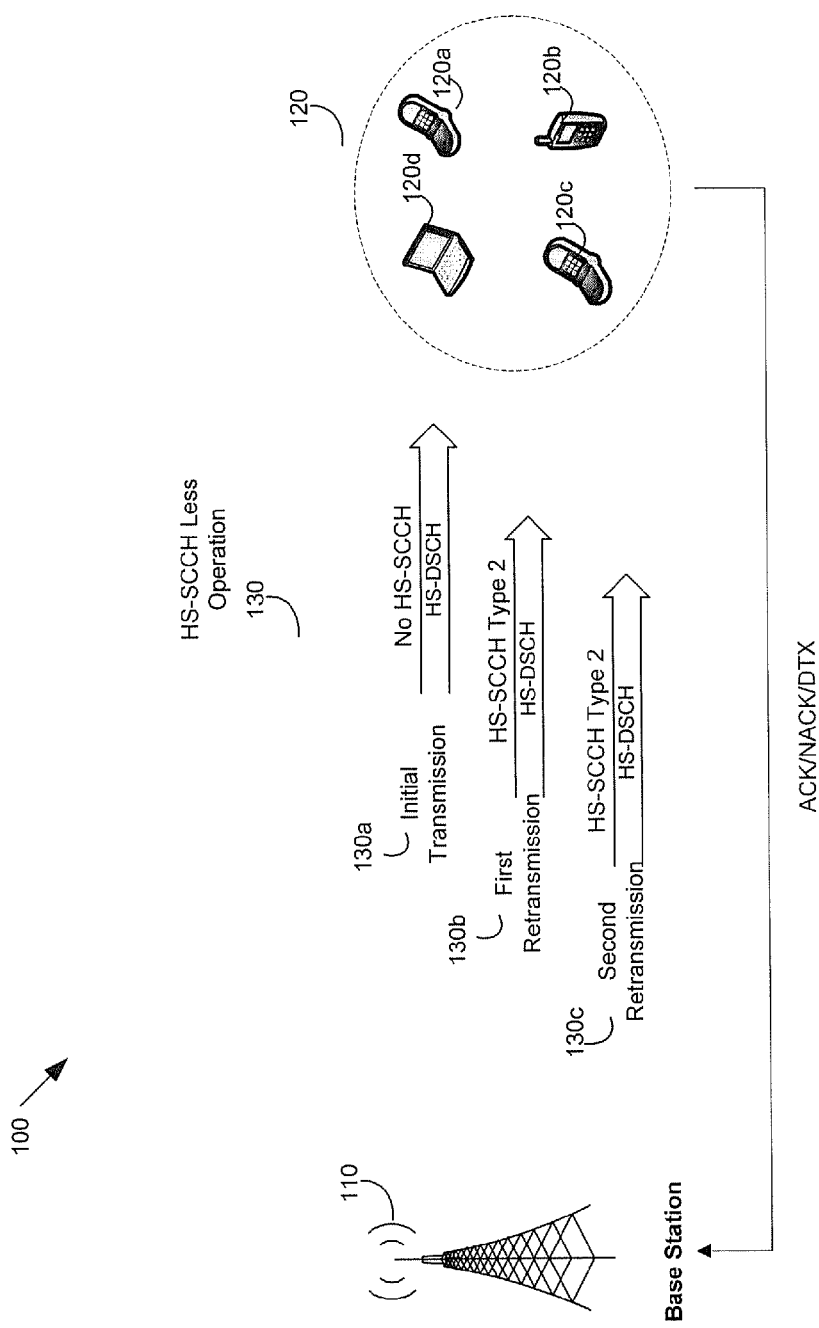
FIG. 1 is a diagram of an exemplary HSDPA enabled communication system that is operable to concurrently locate systematic bits and parity bits in physical channel memory to increase HARQ processing speed during continuous packet connectivity (CPC) operation, in accordance with an embodiment of the invention.

FIG. 1 is a diagram of an exemplary HSDPA enabled communication system that is operable to concurrently locate systematic bits and parity bits in physical channel memory to increase HARQ processing speed during continuous packet connectivity (CPC) operation, in accordance with an embodiment of the invention. Referring to FIG. 1, there is shown a base station 110 and a plurality of user equipments (UEs) 120, of which UEs 120a-120d are illustrated. A HS-SCCH-less operation 130 may be performed in the downlink communication.

The base station 110 may comprise suitable logic, circuitry, interfaces and/or code that may be operable to perform air interface processing and schedule communication resources in both uplink communications and downlink communications to various UEs such as the UE 120a in a timely manner. The base station 110 may be operable to support HSDPA and other downlink communication technologies. Various algorithms may be used by the base station 110 to determine which UE may receive a data packet and at what time the receiving should occur. In instances where HSDPA may be active, results of the determination may be reported to, for example, the UE 120a, via a High Speed Shared Control Channel (HS-SCCH). The base station 110 may be operable to transmit a HS-SCCH to notify the UE 120a of the control information for the next data transmission over a HS-DSCH. In this regard, the base station 110 may be operable to manage a HS-DSCH transmission via a legacy HS-SCCH operation or a HS-SCCH-less operation.

In the legacy HS-SCCH operation, the base station 110 may be operable to transmit a HS-SCCH with every HS-PDSCH transmission. The HS-SCCH-less operation 130 is a special HSDPA operation mode. In the HS-SCCH-less operation 130, the base station 110 may perform an initial HS-PDSCH transmission without signaling an associated HS-SCCH. The associated HS-SCCH may be transmitted in one or more subsequent HS-PDSCH retransmissions. In the LTE standard, up to two subsequent HS-PDSCH retransmissions are proposed in the HS-SCCH-less operation 130. In this regard, the same HS-PDSCH data may be transmitted using different redundancy versions in the initial HS-PDSCH transmission and the one or more subsequent HS-PDSCH retransmissions, respectively. Different HS-PDSCH transmissions in the HS-SCCH-less operation 130 may comprise varying proportion of systematic bits and/or parity bits (parity 1 bits and parity 2 bits) of the same HS-PDSCH data. The utilization of the HS-SCCH-less operation may reduce the HS-SCCH signaling overhead and save UE battery consumption. For each HS-PDSCH transmission, the base station 110 may be operable to determine whether to apply the HS-SCCH-less operation 130 or not. For example, the base station 110 may be configured to perform the HS-SCCH-less operation 130 for services such as VoIP that may be characterized with relatively small size HS-PDSCH transmissions.

The HS-SCCH-less operation 130 may comprise an initial transmission 130a, a first retransmission 130b, and a second retransmission 130c. Quadrature phase shift keying (QPSK) and one or two pre-defined channelization codes may be used in the HS-SCCH-less operation 130. Different redundancy versions of the same HS-PDSCH data may be applied to HS-PDSCH transmissions, for example, in the initial transmission 130a, the first retransmission 130b and the second retransmission 130c, respectively. In this regard, HS-PDSCH transmission in the initial transmission 130a, the first retransmission 130b and the second retransmission 130c may comprise varying proportions of systematic bits and parity bits (parity 1 bits and parity 2 bits) of the same HS-PDSCH data. In the initial transmission 130a, the base station 110 may be operable to perform a HS-PDSCH transmission to a target UE such as the UE 120a without transmitting an associated HS-SCCH. Redundancy version 0 may be utilized for the HS-PDSCH transmission in the initial transmission 130a. One of four pre-defined transport formats may be applied to the HS-PDSCH transmission in the initial transmission 130a. A correct transport format may be blindly detected at the UE 120a for the HS-PDSCH transmission in the initial transmission 130a. An ACK may be transmitted over a HS-DPCCH from the UE 120a to the base station 110 to indicate that corresponding data packets in the initial transmission 130a may be received successfully. In instances when the base station 110 may not receive an ACK from the UE 120a within a certain time period after the initial transmission 130a, this may be an indication that the UE 120a may not receive the data packets in the initial transmission 130a correctly. The base station 110 may then be configured to perform HS-PDSCH retransmissions.

The number of the HS-PDSCH retransmissions may be limited to, for example, two, in the HS-SCCH-less operation 130. In contrast to the initial transmission 130a, a HS-SCCH signaling may be utilized in the first retransmission 130b and the second retransmission 130c, respectively. The bits on the associated HS-SCCH may be re-interpreted in the HS-SCCH-less operation 130, accordingly. A HS-SCCH that is used in the legacy HS-SCCH operation is called HS-SCCH type 1. A HS-SCCH that is used in the HS-SCCH-less operation 130 is called HS-SCCH type 2. The redundancy versions of 3 and 4 may be used for corresponding HS-PDSCH transmissions in the first retransmission 130b and the second retransmission 130c, respectively. In addition, a UE specific CRC attachment may be used in the HS-SCCH-less operation 130. In the first retransmission 130b and the second retransmission 130c, an ACK or a NACK may be transmitted to the base station 110 to indicate that the corresponding HS-PDSCH transmissions may be received successfully or incorrectly.

A UE such as the UE 120a may comprise suitable logic circuitry, interfaces and/or code that may be operable to communicate radio frequency signals with the base station 110 utilizing, for example, HSDPA. In HSDPA reception, the UE 120 may be operable to detect relevant control information on a HS-SCCH for receiving an associated HS-PDSCH transmission from the base station 110. The control information may comprise, for example, the number of codes, new data indicator, and modulation type (QPSK or 16QAM). The HS-SCCH may be in a format of a HS-SCCH type 1 or a HS-SCCH type 2. In instances where the base station 110 may operate in a legacy HS-SCCH operation, the UE 120a may be operable to decode the control information for the associated HS-PDSCH transmission on the HS-SCCH type 1. In this regard, the UE 120a may be operable to continuously read and/or decode control information on the HS-SCCH type 1. As soon as the control information may be decoded, the UE 120a may be operable to switch to the associated HS-PDSCH resources for receiving data packets.

In instances where the base station 110 may operate in a HS-SCCH-less operation, the UE 120a may be operable to blind decode the HS-PDSCH channel using, for example, at most four different pre-determined transport formats, when the decoding of the HS-SCCH fails the CRC check, e.g. HS-SCCH less operation is activated. The UE 120a may be operable to read and/or decode control information on the HS-SCCH type 2 for $1^{st}$ and $2^{nd}$ retransmission when HS-SCCH decoding passes the CRC check. A HS-PDSCH transmission may be received using one or two pre-configured channelization codes in the HS-SCCH less operation. In instances where the UE 120a may fail to decode the HS-SCCH type 2, then the UE 120a may be operable to blindly decode the HS-PDSCH transmission by using each of the four pre-determined transport formats. In instance where the UE 120a may be operable to receive the HS-PDSCH transmission correctly, the UE 120a may be operable to transmit an ACK to the base station 110 to indicate that the HS-PDSCH transmission may be received correctly at the UE 120a. In instance where the UE 120a may fail to receive the HS-PDSCH transmission correctly, the UE 120a may not transmit a negative acknowledgement (NACK) to the base station 110 in the initial transmission 130a. However, the UE 120a may be configured to transmit a NACK in the first retransmission 130b and/or the second retransmission 130c to indicate the failure in receiving the corresponding HS-PDSCH transmission at the UE 120a. Following successful decoding of the HS-SCCH type 2, the UE 120a may be operable to switch to associated HS-PDSCH resources to receiving data packets of the corresponding HS-PDSCH transmissions, accordingly. In this regard, different HS-PDSCH transmissions in the HS-SCCH-less operation 130 may comprise varying proportion of systematic bits and parity bits (parity 1 bits and parity 2 bits) of the same HS-PDSCH data. Different HS-PDSCH transmissions in the HS-SCCH-less operation 130 may be transmitted from the base station 110 using different redundancy versions of the same HS-PDSCH data.

The UE 120a may be operable to buffer or store the HS-PDSCH transmissions received in the initial transmission 130a, the first retransmission 130b and the second retransmission 130c so as to support HARQ processing in the HS-SCCH-less operation 130. Data packets in the received HS-PDSCH transmissions may be processed such as quantized and/or de-interleaved prior to storage. The UE 120a may be operable to write or store bits such as systematic bits and/or parity bits of the processed HS-PDSCH data packets into physical channel memory. The stored systematic and/or parity bits may be indexed in physical channel memory according to corresponding transmission parameters such as, for example, redundancy version and/or number of physical channels. Rate matching on systematic bits and parity bits may be performed, separately and concurrently. In this regard, memory location addresses for systematic bits and parity bits of interest in the physical memory may be computed using corresponding transmission parameters. The UE 120a may be operable to concurrently request and/or read the systematic bits and parity bits of interest from the physical channel memory according to the computed memory location addresses. The UE 120a may be operable to carry out rate matching on systematic bits and parity bits equally. Rate matching on systematic bits and parity bits may be performed concurrently so as to achieve a faster HARQ process in the HS-SCCH-less operation 130.

Although a bit collection algorithm for concurrently locating systematic bits and parity bits in physical channel memory to increase HARQ processing speed during continuous packet connectivity (CPC) operation in a HSDPA communication system is illustrated in FIG. 1, the invention need not be so limited. Accordingly, concurrently locating systematic bits and parity bits in physical channel memory may also be utilized in any other communication systems that embody bit collection schemes without departing from the spirit and scope of various embodiments of the invention.

In operation, the UE 120a may be operable to receive HS-PDSCH transmissions from the base station 110. The base station 110 may be operable to perform the HS-PDSCH transmissions using a legacy HS-SCCH operation or a HS-SCCH-less operation. In the legacy HS-SCCH operation, the base station 110 may be operable to perform the HS-PDSCH transmissions together with relevant control information in a HS-SCCH type 1. The UE 120a may be operable to detect relevant control information for receiving the HS-PDSCH transmissions. In the HS-SCCH-less operation 130, the base station 110 may be operable to perform HS-PDSCH transmissions together with relevant control information in a HS-SCCH type 2. In this regard, the UE 120a may be operable to receive a HS-PDSCH transmission with relevant control information in the HS-SCCH type 2. In instances when the UE 120a may fail to decode the HS-SCCH type 2 or may not receive the HS-SCCH type 2, the UE 120a may be operable to blindly decode the HS-PDSCH transmission by using, for example, up to four pre-determined transport formats.

In instances where the UE 120a may be operable to decode the HS-SCCH type 2, successfully, the UE 120a may be operable to switch to associated HS-PDSCH resources to receive data packets in the corresponding HS-PDSCH transmissions. Different HS-PDSCH transmissions in the HS-SCCH-less operation 130 may comprise varying proportion of systematic bits and/or parity bits (parity 1 bits and parity 2 bits) of the same HS-PDSCH data. The UE 120a may be operable to buffer or store the received HS-PDSCH transmissions so as to support HARQ processing in the HS-SCCH-less operation 130. The UE 120a may be operable to process data packets in the received HS-PDSCH transmissions prior to storage. The UE 120a may be operable to store systematic bits and/or parity bits of the processed HS-PDSCH data packets into physical channel memory. The stored systematic and/or parity bits in the physical channel memory may be indexed or addressed according to corresponding transmission parameters such as, for example, redundancy version, number of systematic bits and/or number of physical channels utilized in corresponding received HS-PDSCH transmissions.

The UE 120a may be operable to perform rate matching on systematic bits and parity bits, separately and concurrently. The UE 120a may be operable to compute memory location indexes or addresses of systematic bits and parity bits of interest according to corresponding transmission parameters. The UE 120a may be operable to concurrently request and/or read the systematic bits and parity bits of interest from the physical channel memory based on the computed memory location addresses or indexes. Rate matching on systematic bit and parity bits may be served equally and may be performed in parallel to achieve a faster HARQ process in the HS-SCCH-less operation 130.

Figure 2:
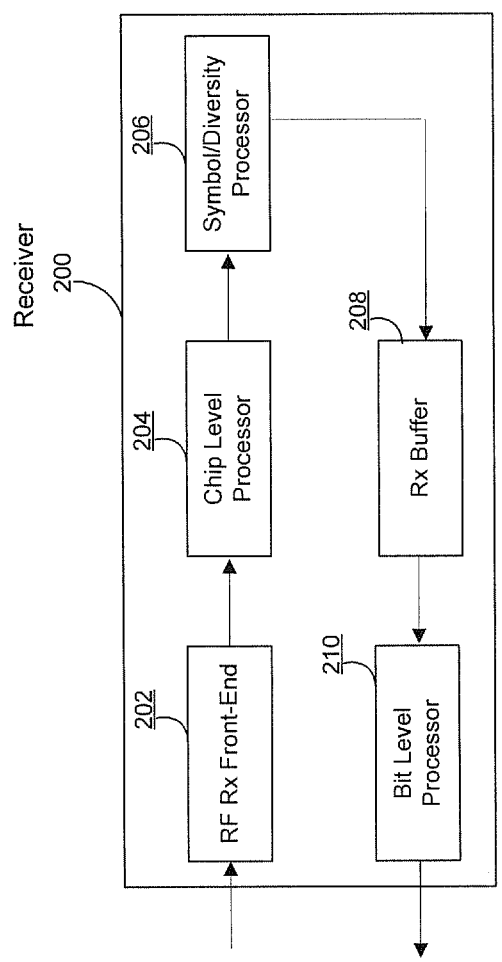
FIG. 2 is a block diagram illustrating an exemplary receiver that is operable to concurrently locate systematic bits and parity bits in physical channel memory to support fast HARQ processing during continuous packet connectivity (CPC) operation, in accordance with an embodiment of the invention.

FIG. 2 is a block diagram illustrating an exemplary receiver that is operable to concurrently locate systematic bits and parity bits in physical channel memory to support fast HARQ processing during continuous packet connectivity (CPC) operation, in accordance with an embodiment of the invention. Referring to FIG. 2, there is shown a receiver 200. The receiver 200 comprises a RF Rx front-end 202, a chip level processor 204, a symbol/diversity processor 206, a Rx buffer 208 and a bit level processor 210.

The RF Rx front-end 202 may comprise suitable logic, circuitry, interfaces and/or code that may be operable to process RF signals received, for example, over a LTE/E-UTRA air interface. The RF Rx front-end 202 may be operable to convert the received RF signals to corresponding baseband signals and communicated with the chip level processor 204 for chip level baseband processing.

The chip level processor 204 may comprise suitable logic, circuitry, interfaces and/or code that may be operable to process baseband signals received from the RF Rx front-end 202 at chip level. For example, the chip level processor 204 may be operable to perform chip level equalization for intra-cell and/or inter-cell interference suppression. The chip level processor 204 may be operable to produce soft symbols via chip level combining. The produced soft symbols may be communicated with the symbol/diversity processor 206.

The symbol/diversity processor 206 may comprise suitable logic, circuitry, interfaces and/or code that may be operable to perform de-scrambling, de-channelization and/or transmit diversity decoding. The symbol/diversity processor 206 may be operable to support, for example, physical channel configurations for the base station 110 in a HS-SCCH-less operation. The symbol/diversity processor 206 may be operable to generate output processed soft symbols, which may be communicated to the Rx buffer 208.

The Rx buffer 208 may comprise suitable logic, circuitry, interfaces and/or code that may be operable to store in-phase (I), and quadrature (Q) samples of processed soft symbols from the symbol/diversity processor 206. The Rx buffer 208 may be implemented as a FIFO buffer. The size of the Rx buffer 208 may be large enough to store, for example, up to 1920 samples. Up to 3 slots of data packets associated with HS-PDSCH transmissions received from the base station 110 may be stored in the Rx buffer 208. For a symbol-by-symbol HARQ operation, the size of the Rx buffer 208 may be reduced to less than a TTI time period. Data format for the contents in the Rx buffer 208 may vary based on, for example, the number of physical channels that may be used in the received HS-PDSCH transmissions. The Rx buffer 208 may comprise RAM, ROM, low latency nonvolatile memory such as flash memory and/or other suitable electronic data storage.

The bit level processor 210 may comprise suitable logic, circuitry, interfaces and/or code that may be operable to process symbols in the Rx buffer 208 at bit level. The bit level processor 210 may be operable to perform, for example, quantization, HARQ processing, and/or HSDPA Turbo decoding for symbols from the Rx buffer 208. In this regard, the bit level processor 210 may be operable to extract varying proportion of systematic bits and/or parity bits (parity 1 bits and parity 2 bits) from stored symbols of the same HS-PD-SCH data. The extracted systematic bits and/or parity bits may be buffered or stored in physical channel memory for HAQR processing in the HS-SCCH-less operation 130. The buffered systematic bits and parity bits in the physical channel memory may be addressed or indexed based on corresponding transmission parameters such as, for example, redundancy version, number of systematic bits and/or number of physical channels used in the corresponding received HS-PDSCH transmissions. The bit level processor 210 may be operable to calculate memory location addresses or indexes for systematic bits and parity bits of interest using corresponding transmission parameters. The bit level processor 210 may be operable to concurrently request and/or read the systematic bits and parity bits of interest from the physical channel memory according to corresponding calculated memory location addresses or indexes. Rate matching on systematic bits and parity bits may be served equally and may be performed in parallel to achieve a faster HARQ process in the HS-SCCH-less operation 130.

In an exemplary operation, the RF Rx front-end 202 of the receiver 200 may be operable to receive a RF signal from, for example, the base station 110 via HSDPA. The received RF signal may be converted into a corresponding baseband signal and communicated to the chip level processor 204. The chip level processor 204 may be operable to process the received baseband signal at chip level to produced soft symbols for further symbol level processing via the symbol/diversity processor 206. The symbol/diversity processor 206 may be configured to support a HS_SCCH-less operation of the base station 110. The symbol/diversity processor 206 may be operable to process the soft symbols from the chip level processor 204 and output into the Rx buffer 208. The resulting buffered symbols in the Rx buffer 208 may be communicated with the bit level processor 210 for HSDPA HARQ and Turbo decoding.

The bit level processor 210 may be operable to extract varying proportion of systematic bits and/or parity bits from the buffered symbols in the Rx buffer 208 for the same HS-PDSCH data. The extracted systematic bits and/or parity bits may be addressed or indexed based on corresponding transmission parameters and stored in physical channel memory for HAQR processing. The bit level processor 210 may be operable to calculate memory location addresses or indexes for systematic bits and parity bits of interest according to corresponding transmission parameters. The systematic bits and parity bits of interest may be concurrently requested or read from the physical channel memory according to corresponding calculated memory location addresses or indexes to support rate matching processing. The bit level processor 210 may be operable to perform rate matching on systematic bits and parity bits in parallel for a faster HARQ process in the HS-SCCH-less operation 130.

Figure 3:
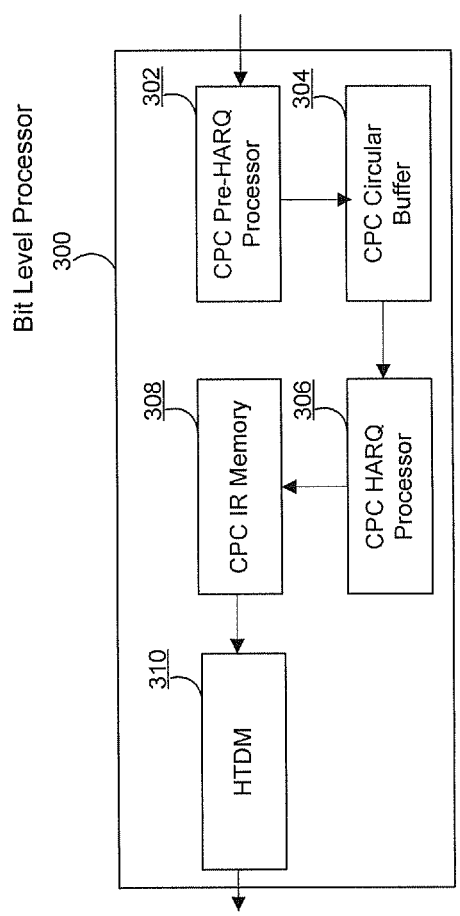
FIG. 3 is a block diagram illustrating an exemplary bit level processor that is utilized in a receiver to concurrently locate systematic bits and parity bits in physical channel memory to increase HARQ processing speed during continuous packet connectivity (CPC) operation, in accordance with an embodiment of the invention.

FIG. 3 is a block diagram illustrating an exemplary bit level processor that is utilized in a receiver to concurrently locate systematic bits and parity bits in physical channel memory to increase HARQ processing speed during continuous packet connectivity (CPC) operation, in accordance with an embodiment of the invention. Referring to FIG. 3, there is shown a bit level processor 300. The bit level processor 300 comprises a CPC pre-HARQ processor 302, a CPC circular buffer 304, a CPC HARQ processor 306, a CPC IR memory 308 and a HSDPA Turbo decoding module (HTDM) 310.

The CPC pre-HARQ processor 302 may comprise suitable logic, circuitry, interfaces and/or code that may be operable to process soft symbols taken from the Rx buffer 208 to support HARQ functions in the HS-SCCH-less operation 130. For example, the CPC pre-HARQ processor 302 may be operable to quantize the soft symbols from the Rx buffer 208. The quantized soft symbols may be de-interleaved and output to the CPC circular buffer 304 for HSDPA Turbo decoding.

The CPC circular buffer 304 may comprise suitable logic, circuitry, interfaces and/or code that may be operable to store processed soft symbols from the CPC pre-HARQ processor 302 to support HARQ functions. The CPC circular buffer 304 may be operable to store, for example, 14 TTIs of processed soft symbols from the CPC pre-HARQ processor 302. In this regard, the CPC circular buffer 304 may be operable to index bits such as systematic bits and/or parity bits of the processed soft symbols from the CPC pre-HARQ processor 302 according to corresponding transmission parameters such as, for example, redundancy version and/or number of physical channels. Systematic bits and parity bits of interest in the CPC circular buffer 304 may be concurrently read out to the CPC HARQ processor 306 based on corresponding indexes.

The CPC HARQ processor 306 may comprise suitable logic, circuitry, interfaces and/or code that may be operable to process soft symbols stored in the CPC circular buffer 304 for various HARQ function in the HS-SCCH-less operation 130. For example, the HARQ processor 306 may be operable to calculate memory location addresses or indexes for systematic bits and parity bits of interest according to corresponding transmission parameters. The HARQ processor 306 may be operable to concurrently request and/or read the systematic bits and parity bits of interest from the CPC circular buffer 304 according to the corresponding calculated memory location indexes. The CPC HARQ processor 306 may be operable to concurrently perform rate matching on systematic bits and parity bits, in instances when it may be required. The resulting rate-matched systematic bits and parity bits may be stored in the CPC IR memory 308 to support packet retransmission.

The CPC IR memory 308 may comprise suitable logic, circuitry, interfaces and/or code that may be operable to store soft symbols from the CPC HARQ processor 306 to support IR combining of retransmitted packet blocks for up to, for example, 3 parallel HARQ processing. For example, a memory space of 4533 soft symbols may be allocated for each HARQ processing. Additional 4533 soft symbol memory space may be also allocated to store soft symbols between the CPC-HARQ processor 306 and the HTDM 310 to support blind format detection in the HS-SCCH-less operation 130.

The HTDM 310 may comprise suitable logic, circuitry, interfaces and/or code that may be operable to perform Turbo decoding. In instances where the base station 110 may be operable to transmit data using the HS-SCCH-less operation 130, the HTDM 310 may be operable to support, for example, at most four pre-defined transport formats in associated HS-PDSCH transmissions from the base station 110. In instances where the receiver 300 may receive a HS-PDSCH transmission from the base station 110 without an associated HS-SCCH, the HTDM 310 may be configured to blindly detect a correct transport format for the received HS-PDSCH transmission by using each of the four pre-defined transport formats. In this regard, the HTDM 310 may be operable to communicate with the CPC HARQ processor 306 for the received HS_PDSCH transmission to be processed using one of the four pre-determined transport formats. In instances when the HTDM 310 completes Turbo decoding with a CRC error over the processed HS-PDSCH transmission in a particular pre-determined transport format, this may imply that the particular pre-determined transport format may not be the correct transport format used in the received HS-PDSCH transmission. The HTDM 310 may be operable to trigger the CPC HARQ processor 306 to process the associated HS-PDSCH transmission using the next pre-determined transport format. In instances when the HTDM 310 completes Turbo decoding without a CRC error over the processed HS-PDSCH transmission in a particular pre-determined transport format, this may indicate that the particular pre-determined transport format may be the correct transport format in the received HS-PDSCH transmission.

In an exemplary operation, the bit level processor 300 may be operable to process soft symbols from the symbol/diversity processor 206 to derive and/or decode bits associated with a received HS-PDSCH transmission from the base station 110. The symbol/diversity processor 206 may be configured to support the HS-SCCH-less operation 130 of the base station 110. The bit level processor 300 may be operable to process soft symbols in the Rx buffer 208 in various ways comprising, for example, quantization and/or de-interleaving by the CPC pre-HARQ processor 302. The resulting processed soft symbols may be stored in the CPC circular buffer 304 to support HARQ processing in the HS-SCCH-less operation 130. Bits for the processed soft symbols may be addressed or indexed in the CPC circular buffer based on corresponding transmission parameters. The CPC HARQ processor 306 may be operable to concurrently perform rate matching on systematic bits and parity bits (parity 1 bits and/or parity 2 bits) for a fast HARQ process. The resulting HARQ processed bits may be stored in the CPC IR memory 308 for Turbo decoding at the HTDM 310 in instances when it may be required.

Figure 4:
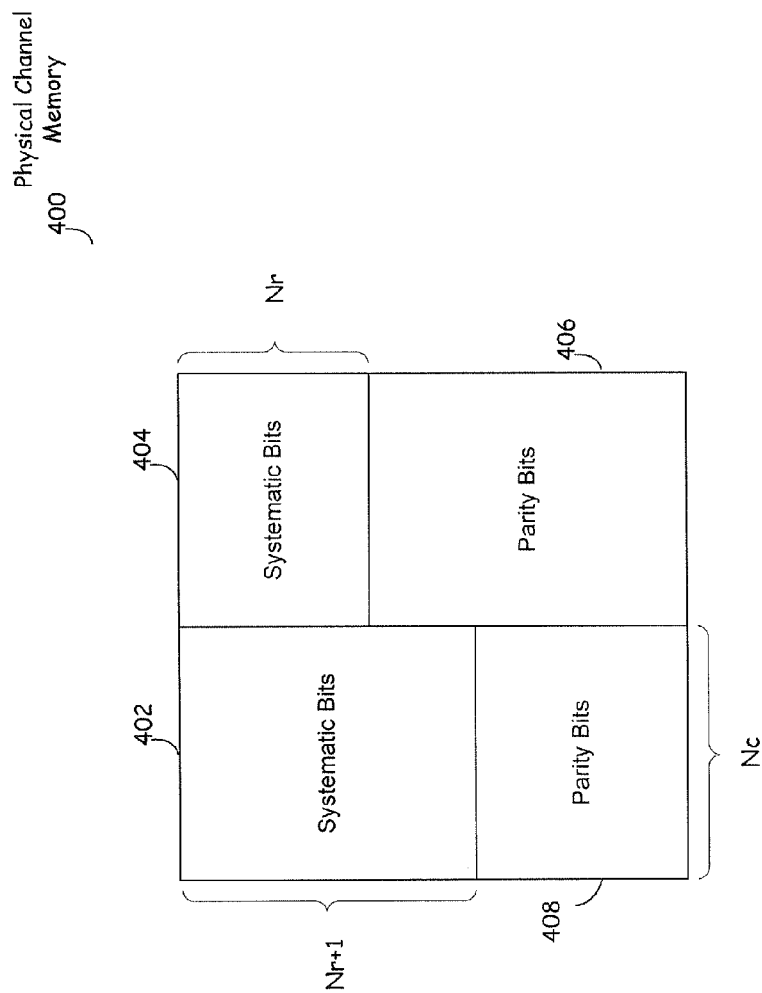
FIG. 4 is a block diagram illustrating an exemplary physical channel memory allocation for systematic bits and parity bits to support fast HARQ processing during continuous packet connectivity (CPC) operation, in accordance with an embodiment of the invention.

FIG. 4 is a block diagram illustrating an exemplary physical channel memory allocation for systematic bits and parity bits to support fast HARQ processing during continuous packet connectivity (CPC) operation, in accordance with an embodiment of the invention. Referring to FIG. 4, there is shown a physical channel memory 400. The physical channel memory 400 comprises memory locations 402-408. The memory locations 402 and 404 may comprise systematic bits. The memory locations 406-408 may comprise parity bits such as parity 1 bits and/or parity 2 bits. The memory locations 402-408 may be determined based on corresponding transmission parameters. For example, the parameters N_phy and N_sys represent a number of physical channels and a number of systematic bits, respectively, in a received HS-PDSCH transmission. The memory locations 402-408 may be indexed using parameters Nr+1, Nr and Nc, which may be determined based on corresponding transmission parameters. For example, Nr and Nc may be calculated as Nr=N_sys/(480×N_phy) and Nc=N_sys−Nr×480×Nphy, respectively.

Figure 5:
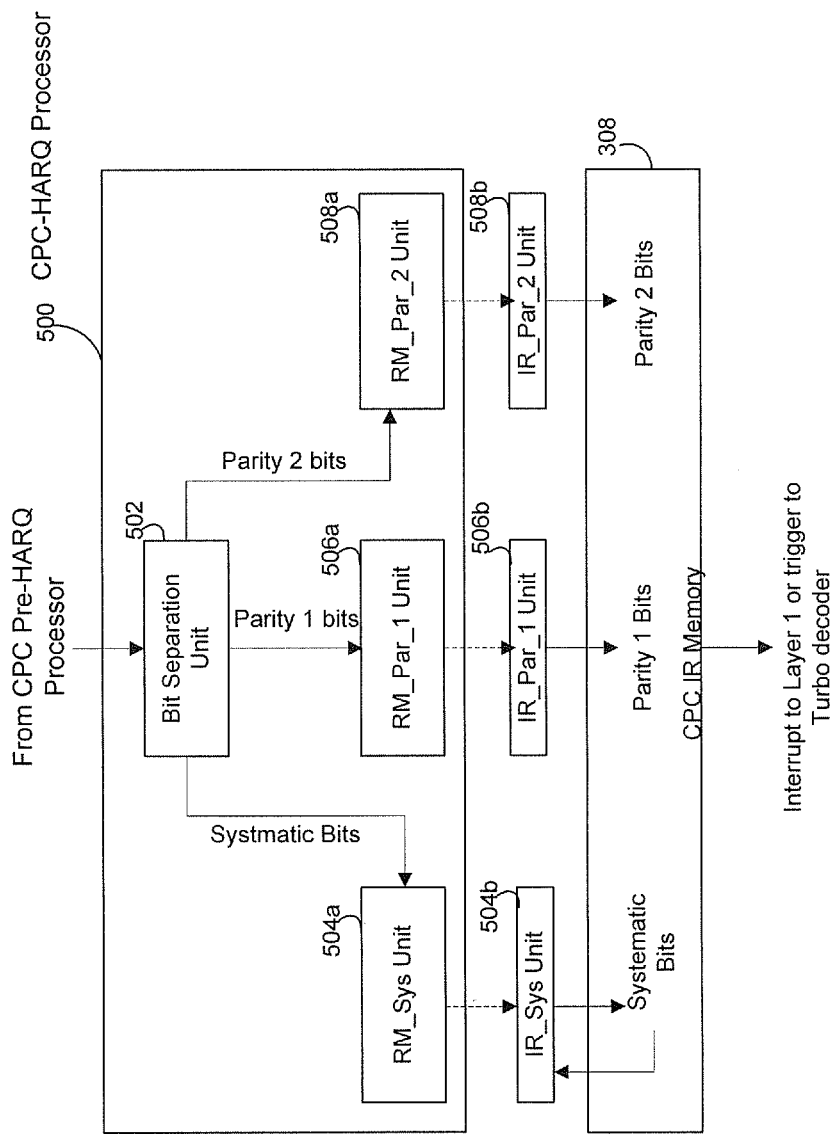
FIG. 5 is a block diagram illustrating an exemplary CPC HARQ processor that is operable to concurrently perform rate matching on systematic bits and parity bits to increase HARQ processing speed during continuous packet connectivity (CPC) operation, in accordance with an embodiment of the invention.

FIG. 5 is a block diagram illustrating an exemplary CPC HARQ processor that is operable to concurrently perform rate matching on systematic bits and parity bits to increase HARQ processing speed during continuous packet connectivity (CPC) operation, in accordance with an embodiment of the invention. Referring to FIG. 5, there is shown a CPC HARQ processor 500, which is coupled to the CPC IR memory 308. The CPC HARQ processor 500 comprises a bit separation unit 502, a systematic bit rate matching (RM_Sys) unit 504a, a systematic bit incremental combining (IR_Sys) unit 504b, a parity bit 1 rate matching (RM_Par_1) unit 506a, a parity bit 1 incremental combining (IR_Par_1) unit 506b, a parity bit 2 rate matching (RM_Par_2) 508a and a parity bit 2 incremental combining (IR_Par_2) unit 508b.

The CPC HARQ processor 500 may comprise suitable logic, circuitry, interfaces and/or code that may be operable to process bits from the CPC circular buffer 304 for various HARQ functions such as bit-level rate matching and/or transmission block combining. In this regard, the CPC HARQ processor 500 may be operable to calculate memory locations within the CPC circular buffer 304 for bits, which are required, according to corresponding transmission parameters. The CPC HARQ processor 500 may be operable to request and/or read the bits it needs based on the calculated memory locations to concurrently perform rate matching on systematic bits and parity bits via the RM_Sys unit 504a, the RM_Par_1 unit 506a and the RM_Par_2 unit 508a. The CPC-HARQ processor 500 may be operable to concurrently process the bits it needs from the CPC circular buffer 304 using various procedures such as, for example, type 0, type 1 and type 2 processing, in accordance with the initial transmission 130a, the first retransmission 130b, and the second retransmission 130c, respectively.

In the type 0 processing, bits of symbols in the initial transmission 130a may be processed in a pre-determined transport format. The resulting processed bits may be output into a virtual space in the CPC IR memory 308 for Turbo decoding via the HTDM 310. In instances where a CRC error may be identified at the HTDM 310, the CPC HARQ processor 500 may be activated or signaled to process the bits of symbols in the initial transmission 130a in next pre-determined transport format. Up to four different pre-determined transport formats may be supported by the CPC HARQ processor 500. In instances where the bits of symbols in the initial transmission 130a may be Turbo decoded without a CRC error, the CPC HARQ processor 500 may stop processing the bits of symbols in the initial transmission 130a. In instances where the bits of symbols in the initial transmission 130a may be processed in each of the four pre-determined transport formats and a CRC error may still remain at the HTDM 310, the CPC HARQ processor 500 may be activated to perform type 1 processing on bits of symbols in the first retransmission 130b.

In the type 1 processing, bits of symbols in the first retransmission 130b may be combined with the bits of symbols in the initial transmission 130a which are stored in the CPC circular buffer 304 and output into the CPC IR memory 308. In instances where the bits of symbols in the first retransmission 130b may be Turbo decoded without a CRC error, the CPC HARQ processor 500 may stop processing the bits for symbols in the first retransmission 130b. Otherwise, the CPC HARQ processor 500 may be operable to perform type 2 processing on bits for symbols in the second retransmission 130c.

In the type 2 processing, bits of symbols in the second retransmission 130c may be combined with bits of symbols in the initial transmission 130a and/or the first retransmission 130b. The combined bits may be output into the CPC IR memory 308 for Turbo decoding.

The bit separation unit 502 may comprise suitable logic, circuitry, interfaces and/or code that may be operable to calculate memory locations for bits that are required in the CPC circular buffer 304 based on corresponding transmission parameters. The bit separation unit 502 may be operable to concurrently request and/or read the bits it needs based on the calculated memory locations. The bit separation unit 502 may be operable to request and/or read bits from the CPC circular buffer 304 to support concurrent rate matching on the systematic bits and the parity bits via the RM_Sys unit 504a, the RM_Par_1 unit 506a and the RM_Par_2 unit 508a.

The RM_Sys unit 504a may comprise suitable logic, circuitry, interfaces and/or code that may be operable to perform rate matching on systematic bits from allocated physical channel capacity in the CPC circular buffer 304 to corresponding allocated IR memory capacity in the CPC IR memory 308.

The IR_Sys unit 504b may comprise suitable logic, circuitry, interfaces and/or code that may be operable to IR combine systematic bits from the RM_Sys unit 504a with stored systematic bits in the CPC IR memory 308.

The RM_Par_1 unit 506a may comprise suitable logic, circuitry, interfaces and/or code that may be operable to perform rate matching on parity 1 bits from allocated physical channel capacity the CPC circular buffer 304 to corresponding allocated IR memory capacity in the CPC IR memory 308.

The IR_Par_1 unit 506b may comprise suitable logic, circuitry, interfaces and/or code that may be operable to IR combine parity 1 bits from the RM_Par_1 unit 506a with stored parity 1 bits in the CPC IR memory 308.

The RM_Par_2 unit 508a may comprise suitable logic, circuitry, interfaces and/or code that may be operable to perform rate matching on parity 2 bits from allocated physical channel capacity the CPC circular buffer 304 to corresponding allocated IR memory capacity in the CPC IR memory 308.

The IR_Par_2 unit 508b may comprise suitable logic, circuitry, interfaces and/or code that may be operable to IR combine parity 2 bits from the RM_Par_2 unit 508a with stored parity 1 bits in the CPC IR memory 308.

In an exemplary operation, the CPC HARQ processor 500 may be operable to HARQ process bits from the CPC circular buffer 304 in one of four pre-determined transport formats. The bit separation unit 502 may be operable to calculate memory location for bits it needs based on corresponding transmission parameters. The bit separation unit 502 may be operable to request and/or read bits it needs from the corresponding calculated memory locations in the CPC circular buffer 304. For each pre-determined transport format, the bit separation unit 502 may be operable to provide bits that are required to the RM_Sys unit 504a, the RM_Par_1 unit 506a and the RM_Par_2 unit 508a. Rate matching on systematic bits and parity bits may be performed concurrently. Retransmitted bits may be combined with corresponding bits stored in the CPC IR memory 308 via the IR_Sys unit 504b, the IR_Par_1 unit 506b and/or the IR_Par_2 unit 508b for Turbo decoding.

Figure 6:
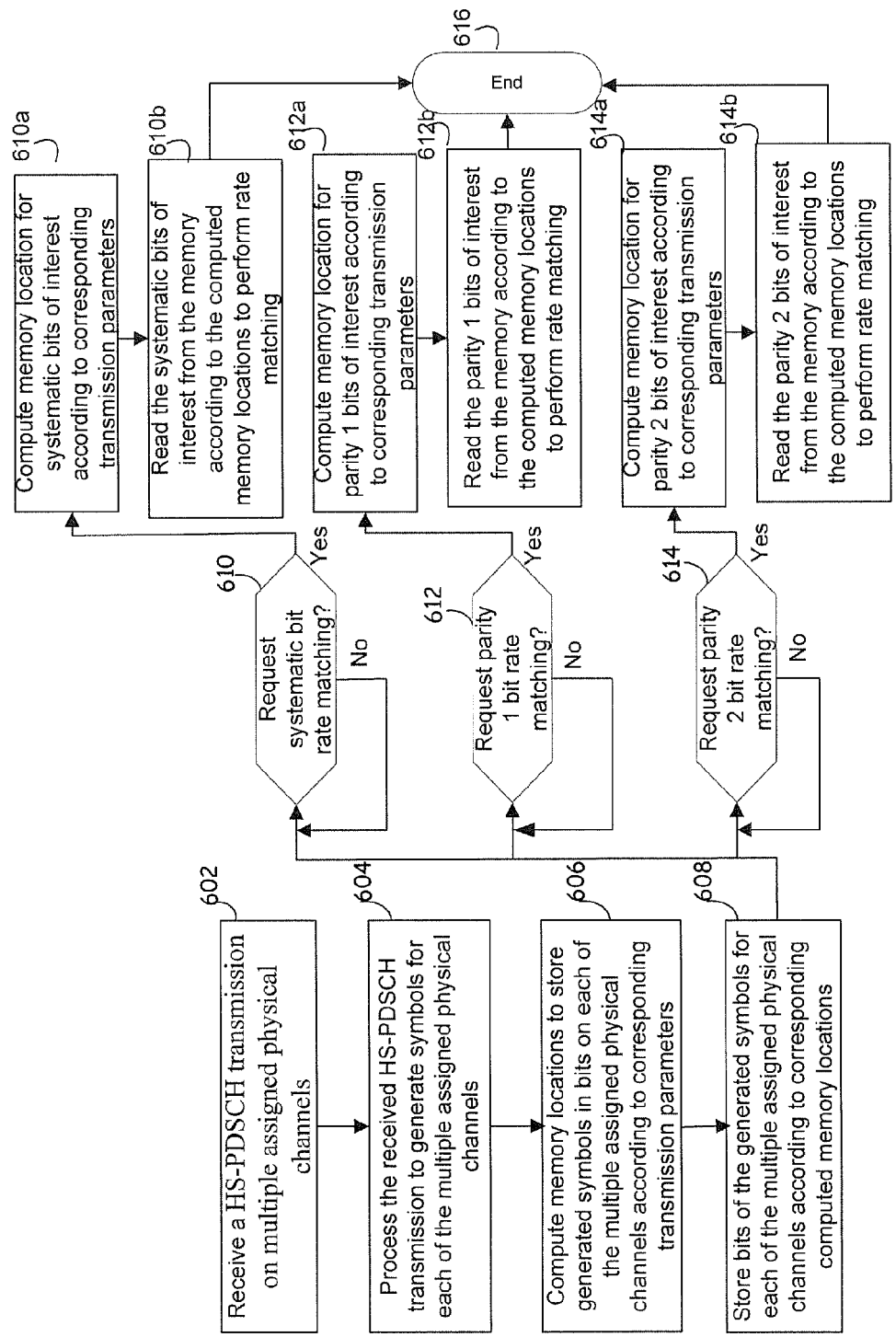
FIG. 6 is a flow chart illustrating exemplary steps for concurrently performing rate matching on systematic bits and parity bits to increase HARQ processing speed during continuous packet connectivity (CPC) operation, in accordance with an embodiment of the invention.

FIG. 6 is a flow chart illustrating exemplary steps for concurrently performing rate matching on systematic bits and parity bits to increase HARQ processing speed during continuous packet connectivity (CPC) operation, in accordance with an embodiment of the invention. Referring to FIG. 6, the exemplary steps start in step 602, where the UE 120a may be operable to receive a HS-PDSCH transmission on multiple assigned physical channels from the base station 110. The base station 110 may be operable to perform the HS-PDSCH transmission using a HS-HSCCH-less operation. In step 604, the received HS-PDSCH transmission may be processed via, for example, the chip level processor 204 and the symbol/diversity processor 206, to produce symbols for each of the multiple assigned physical channels. In step 606, the CPC pre-HARQ processor 302 may be operable to process the produced symbols on each of the multiple assigned physical channels. In this regard, memory locations used for storing bits for the generated symbols within the CPC circular buffer 304 may be computed using corresponding transmission parameters.

In step 608, the bits for the generated symbols may be stored in the CPC circular buffer 304 according to the corresponding computed memory locations. In step 610, it may be determined whether a rate matching on systematic bits may be requested. In instances where rate matching on systematic bits may be requested, then in step 610a, the bit separation unit 502 may be operable to compute memory locations for the systematic bits it needs according to the corresponding transmission parameters. In step 610b, the bit separation unit 502 may be operable to read or request the systematic bits it needs from the CPC circular buffer 304 according to the computed memory locations. The exemplary steps may end in step 616.

In step 610, in instances where a rate matching on systematic bits may not be requested, then the exemplary steps remain in step 610.

In step 612, it may be determined whether a rate matching on parity 1 bits may be requested. In instances where a rate matching on parity 1 bits may be requested, then in step 612a, the bit separation unit 502 may be operable to compute memory locations for the parity 1 bits, which may be required, according to the corresponding transmission parameters. In step 612b, the bit separation unit 502 may be operable to read or request the parity 1 bits, which may be required, from the CPC circular buffer 304 according to the computed memory locations. The exemplary steps may end in step 616.

In step 612, in instances where rate matching on parity 1 bits may not be requested, then the exemplary steps stay in step 612.

In step 614, it may be determined whether rate matching on parity 2 bits may be requested. In instances where a rate matching on parity 2 bits may be requested, then in step 614a, the bit separation unit 502 may be operable to compute memory locations for the parity 2 bits it needs according to the corresponding transmission parameters. In step 614b, the bit separation unit 502 may be operable to read or request the parity 2 bits it needs from the CPC circular buffer 304 according to the computed memory locations. The exemplary steps may end in step 616.

In step 614, in instances where a rate matching on parity 2 bits may not be requested, then the exemplary steps stay in step 614.

Aspects of a method and system for concurrently locating systematic bits and parity bits in physical channel memory to increase HARQ processing speed in 3GPP CPC system are provided. In accordance with various embodiments of the invention, a communication device such as the UE 120a may be operable to receive a HS-PDSCH transmission from the base station 110a. The UE 120a may be operable to concurrently perform rate matching on systematic bits and parity bits of the received HS-PDSCH transmission. The systematic bits and parity bits (parity 1 bits and parity 2 bits) of the received HS-PDSCH transmission may be buffered in a physical channel memory such as the CPC circular buffer 304 to support HARQ processing in the HS-SCCH-less operation 130 of the base station 110. The CPC pre-HARQ processor 302 may be operable to compute memory locations for the systematic bits and the parity bits in the CPC circular buffer 304 according to corresponding transmission parameters such as, for example, redundancy version, number of systematic bits and/or number of physical channels that are used in the received HS-PDSCH transmission.

The systematic bits and the parity bits of the received HS-PDSCH transmission may be stored in the CPC circular buffer 304 according to the corresponding computed memory locations. The bit separation unit 502 may be operable to compute, when it may be required, memory locations for systematic bits and parity bits of interest, which comprise at least a portion of the stored systematic bits and a portion of the stored parity bits in the CPC circular buffer 304 according to corresponding transmission parameters. The bit separation unit 502 may be operable to request the portion of the stored systematic bits and the portion of the stored parity bits from CPC circular buffer 304 according to corresponding computed memory locations. The CPC circular buffer 304 may be operable to concurrently generate the portion of the stored systematic bits and the portion of the stored parity bits according to the request. The CPC HARQ processor 500 may be operable to concurrently perform rate matching on the generated portion of the stored systematic bits and the generated portion of the stored parity bits.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for concurrently locating systematic bits and parity bits in physical channel memory to increase HARQ processing speed in 3GPP CPC system.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing signals in a communication system, comprising:
  performing by one or more processors and/or circuits in a communication device:
    receiving a High Speed Physical Downlink-Shared Channel (HS-PDSCH) transmission;
    buffering systematic and parity bits of said received HS-PDSCH transmission in a physical channel memory;
    extracting a varying proportion of systematic bits and parity bits;
    calculating memory location addresses or indices for the extracted systematic bits and parity bits based on predefined transport formats; and concurrently rate matching systematic bits and parity bits of said received HS-PDSCH transmission based on the calculated memory location addresses or indices for said systematic bits and said parity bits and based on corresponding transmission parameters associated with a plurality of pre-determined transport formats.

2. The method according to claim 1, wherein buffering said systematic bits and said parity bits of said received HS-PDSCH transmission in a physical channel memory includes buffering in a continuous packet connectivity (CPC) circular buffer.

3. The method according to claim 2, wherein said parity bits of said received HS-PDSCH transmission comprise parity 1 bits and parity 2 bits.

4. The method according to claim 1, wherein said performing occurs during a continuous packet connectivity (CPC) operation.

5. The method according to claim 1, wherein said transmission parameters comprise redundancy version, number of systematic bits and/or number of physical channels that are used in said received HS-PDSCH transmission.

6. The method according to claim 1, further comprising storing said systematic bits and said parity bits of said received HS-PDSCH transmission in said physical channel memory according to corresponding ones of said computed memory locations.

7. The method according to claim 6, further comprising computing memory locations for at least a portion of said stored systematic bits and a portion of said stored parity bits in said physical channel memory according to said corresponding transmission parameters.

8. The method according to claim 7, further comprising requesting said portion of said stored systematic bits and said portion of said stored parity bits from said physical channel memory according to said corresponding computed memory locations.

9. The method according to claim 8, further comprising concurrently generating said portion of said stored systematic bits and said portion of said stored parity bits according to said request.

10. The method according to claim 9, further comprising concurrently performing rate matching on said generated portion of said stored systematic bits and said generated portion of said stored parity bits.

11. A system for signal processing, comprising:
one or more processors and/or circuits for use within a communication device, wherein said one or more processors and/or circuits are configured to receive a High Speed Physical Downlink-Shared Channel (HS-PDSCH) transmission; and
said one or more processors and/or circuits are further configured to:
buffer systematic and parity bits of said received HS-PDSCH transmission in a physical channel memory;
extract a varying proportion of systematic bits and parity bits;
calculate memory location addresses or indices for the extracted systematic bits and parity bits based on pre-defined transport formats; and
concurrently rate match systematic bits and parity bits of said received HS-PDSCH transmission based on the calculated memory location addresses or indices for systematic bits and parity bits and based on corresponding transmission parameters associated with a plurality of pre-determined transport formats.

12. The system according to claim 11, wherein said physical channel memory includes a continuous packet connectivity (CPC) circular buffer.

13. The system according to claim 12, wherein said parity bits of said received HS-PDSCH transmission comprise parity 1 bits and parity 2 bits.

14. The system according to claim 11, wherein said one or more processors and/or circuits are further configured to receive said HS-PDSCH transmission and to concurrently rate match said systematic bits and said parity bits during a continuous packet connectivity (CPC) operation.

15. The system according to claim 11, wherein said transmission parameters comprise redundancy version, number of systematic bits and/or number of physical channels that are used in said received HS-PDSCH transmission.

16. The system according to claim 11, wherein said one or more processors and/or circuits are further configured to store said systematic bits and said parity bits of said received HS-PDSCH transmission in said physical channel memory according to corresponding ones of said computed memory location addresses.

17. The system according to claim 16, wherein said one or more processors and/or circuits are further configured to compute memory locations for at least a portion of said stored systematic bits and a portion of said stored parity bits in said physical channel memory according to said corresponding transmission parameters.

18. The system according to claim 17, wherein said one or more processors and/or circuits are further configured to request said portion of said stored systematic bits and said portion of said stored parity bits from said physical channel memory according to said corresponding computed memory locations.

19. The system according to claim 18, wherein said one or more processors and/or circuits are further configured to concurrently generate said portion of said stored systematic bits and said portion of said stored parity bits according to said request.

20. The system according to claim 19, wherein said one or more processors and/or circuits are further configured to concurrently perform rate matching on said generated portion of said stored systematic bits and said generated portion of said stored parity bits.

* * * * *